United States Patent
D'Angelo et al.

(10) Patent No.: US 9,937,775 B2
(45) Date of Patent: Apr. 10, 2018

(54) AIR NOZZLE

(75) Inventors: Marco D'Angelo, Stuttgart (DE);
Thomas Rais, Marbach/Neckar (DE);
Axel Tidelski, Leinfelden-Echterdingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 579 days.

(21) Appl. No.: 13/982,595

(22) PCT Filed: Feb. 2, 2012

(86) PCT No.: PCT/EP2012/051810
§ 371 (c)(1),
(2), (4) Date: Oct. 15, 2013

(87) PCT Pub. No.: WO2012/104397
PCT Pub. Date: Aug. 9, 2012

(65) Prior Publication Data
US 2014/0030974 A1    Jan. 30, 2014

(30) Foreign Application Priority Data
Feb. 2, 2011   (DE) .................. 10 2011 003 489

(51) Int. Cl.
*B60H 1/34*   (2006.01)
(52) U.S. Cl.
CPC ......... *B60H 1/3457* (2013.01); *B60H 1/3428* (2013.01); *B60H 1/3442* (2013.01)
(58) Field of Classification Search
CPC .. B60H 1/3457; B60H 1/3428; B60H 1/3442; B60H 1/347
(Continued)

(56) References Cited

U.S. PATENT DOCUMENTS 3,420,448 A * 1/1969 Snow .................. F24F 11/04
                                                    239/569
4,006,673 A * 2/1977 Meyer ................ B60H 1/3442
                                                    251/352
(Continued)

FOREIGN PATENT DOCUMENTS

DE          2347541 A1 *  4/1975 ......... B60H 1/3442
DE   WO 2005068233 A1 *  7/2005 ......... B60H 1/00735
(Continued)

OTHER PUBLICATIONS

Bourbon (EP 14220088A1) Device for controlling a fluid flow and orientating that fluid in a determined direction (May 26, 2004); machine translation via Espacenet: European Patent Office.*
(Continued)

*Primary Examiner* — Alissa Tompkins
*Assistant Examiner* — Frances F Hamilton
(74) *Attorney, Agent, or Firm* — Paul D. Strain, Esq.; Strain & Strain PLLC

(57) ABSTRACT

An air nozzle for discharging an air flow from an air supply duct of a heating, ventilation or air-conditioning system, in particular in a passenger compartment of a vehicle, composed of a nozzle body and of a receiving element which receives the nozzle body, wherein the receiving element is arranged on the air supply duct, and wherein the nozzle body and/or the receiving element are/is mounted so as to be pivotable about at least one degree of freedom, wherein in the interior of the nozzle body there is arranged a swirl insert which is arranged fixedly and which is connected rigidly to the nozzle body.

10 Claims, 2 Drawing Sheets

(58) Field of Classification Search
USPC .................................................. 454/152, 154
See application file for complete search history.

(56) References Cited

U.S. PATENT DOCUMENTS

| | | | | |
|---|---|---|---|---|
| 4,092,907 A * | 6/1978 | Meyer | ...................... | B60H 1/24 251/352 |
| 5,746,651 A * | 5/1998 | Arajs | .................... | B60H 1/3442 454/154 |
| 5,967,891 A * | 10/1999 | Riley | .................... | B60H 1/3442 454/154 |
| 7,014,557 B2 * | 3/2006 | Thomassin | ........... | B60H 1/3442 454/154 |
| 7,871,317 B2 * | 1/2011 | Meckes | ................. | B60H 1/3442 454/147 |
| 8,834,240 B2 * | 9/2014 | Azzouz | ................. | B60H 1/3435 454/143 |
| 2005/0239390 A1 * | 10/2005 | Leopold | ............... | B60H 1/3442 454/154 |
| 2007/0060035 A1 * | 3/2007 | Burr | ...................... | B60H 1/3442 454/155 |
| 2007/0111652 A1 * | 5/2007 | Klingler | ................. | B60H 1/345 454/155 |
| 2008/0105754 A1 * | 5/2008 | Baruschke | .......... | B60H 1/00735 236/91 F |
| 2010/0130115 A1 * | 5/2010 | Miki | ........................ | B60H 1/34 454/155 |
| 2011/0086588 A1 * | 4/2011 | Demma | ............... | B60H 1/3421 454/162 |
| 2011/0105009 A1 * | 5/2011 | Fritsche | ............... | B60H 1/3457 454/162 |
| 2011/0111685 A1 * | 5/2011 | Benamira | ............ | B60H 1/3442 454/155 |

FOREIGN PATENT DOCUMENTS

| | | | | |
|---|---|---|---|---|
| DE | 10200500206 A1 * | 8/2005 | .......... | B60H 1/3457 |
| DE | 10 2005 012 538 A1 | 10/2005 | | |
| DE | 10 2004 023 495 A1 | 12/2005 | | |
| DE | 202006006597 U1 * | 7/2006 | .......... | B60H 1/3414 |
| DE | 102007018022 A1 * | 11/2007 | .......... | B60H 1/3414 |
| DE | 10 2007 019 602 B3 | 6/2008 | | |
| DE | 10 2007 013 868 A1 | 9/2008 | | |
| DE | 102007013868 A1 * | 9/2008 | .......... | B60H 1/3421 |
| DE | 10 2007 018 022 B4 | 4/2009 | | |
| DE | 102007046664 A1 * | 4/2009 | ............ | B60H 1/345 |
| DE | 10 2008 002 958 B3 | 10/2009 | | |
| DE | 10 2008 033 339 A1 | 1/2010 | | |
| DE | 102013213459 A1 * | 1/2015 | .......... | B60H 1/3457 |
| EP | 1 332 899 A2 | 8/2003 | | |
| EP | 1422088 A1 * | 5/2004 | .......... | B60H 1/3442 |
| EP | 2258572 A2 * | 12/2010 | .......... | B60H 1/3457 |
| EP | 2322369 B1 * | 2/2017 | .......... | B60H 1/3421 |
| GB | 1310493 A * | 3/1973 | .......... | B60H 1/3442 |
| WO | WO 2005068233 A1 * | 7/2005 | ........ | B60H 1/00735 |

OTHER PUBLICATIONS

International Search Report, PCT/EP2012/051810, dated May 31, 2012, 2 pgs.
German Search Report, DE 10 2011 003 489.7, dated Sep. 16, 2011, 8 pgs.

\* cited by examiner

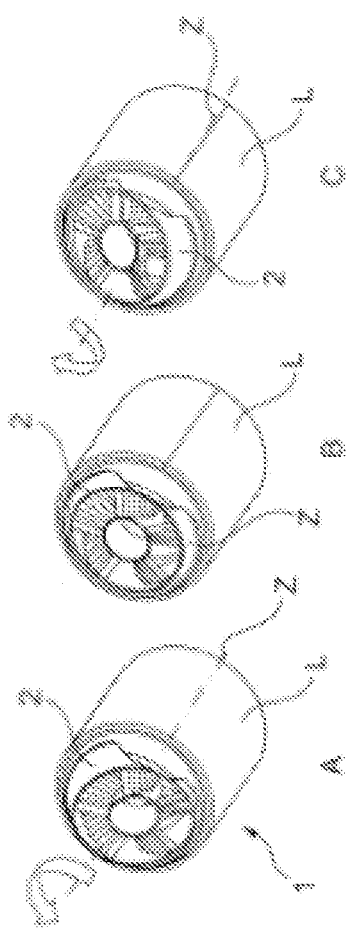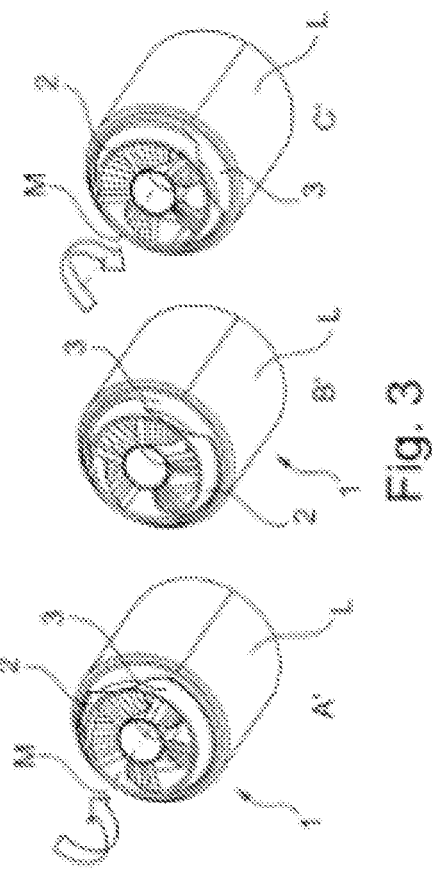

AIR NOZZLE

CROSS-REFERENCE TO RELATED PATENT APPLICATIONS

This application is a National Stage of International Application No. PCT/EP2012/051810, filed Feb. 2, 2012, which is based upon and claims the benefit of priority from prior German Patent Application No. 10 2011 003 489.7, filed Feb. 2, 2011, the entire contents of all of which are incorporated herein by reference in their entirety.

The invention relates to an air nozzle according to the preamble of claim 1.

In order to achieve diffuse ventilation flow devices in a vehicle, there is, for example, the possibility of swirling the airstream to be discharged. That is to say, with the air quantity being the same, because of the swirl effect, the outflowing airstream can be dispensed into the vehicle interior by means of lower air velocities, in order to ensure draft-free ventilation. In order to swirl the airstream, swirl helices or blade geometries adjustable inside a basic body are mostly used.

DE 10 2007 018 022 B4 relates to an air nozzle for routing an airstream out of an air feed shaft or out of an air feed in heating, ventilation or air conditioning systems, for example for passenger spaces in motor vehicles. The air nozzle in this case has a housing and a swirl insert arranged in the inner space of the housing. The swirl insert has a centric basic body, on the surface area of which a plurality of swirl elements are fastened in a distributed manner. By the swirl insert being pivoted with respect to the longitudinal axis of the housing, the direction of the airstream emerging from the air nozzle can be varied.

The disadvantage of the embodiments known from the prior art, however, is that, because of differently adjustable outflow modes, diffuse nozzles have high complexity, as compared with standard outflow devices. This makes it more complicated for the user to operate them. In particular, since there are too many possible settings, the user has difficulty in setting the air nozzle satisfactorily.

The object of the present invention, therefore, is to make available a simplified and at the same time improved air nozzle.

This object is achieved by means of an air nozzle having the features of claim 1. Advantageous refinements are the subject matter of the subclaims.

In the air nozzle configured according to the invention, in the inner space of the nozzle body there is arranged a fixedly arranged swirl insert connected rigidly to the nozzle body. The swirl insert is designed such that there can be no separate adjustment of the swirl insert with respect to the nozzle body. A procedure to adjust the swirl body therefore also results in direct adjustment of the swirl insert. The swirl insert is in this case suitable for discharging a diffuse airstream or can be operated in the diffuse mode. An air nozzle is thus provided, which has the possibility of draft-free ventilation of the passenger space and/or the function of defrosting the side windows, while at the same time having reduced complexity. As required or according to the customer's wishes, the swirl insert in the nozzle body and therefore the intensity of the diffuse nature can be configured and coordinated individually. The function of defrosting the side window is implemented in that the air field becomes wider and, with the air quantity being the same, a larger region is ventilated than in the case of a conventional nozzle.

In one embodiment, the nozzle body provided with a rigid swirl insert may be a structural unit formed in one piece. For example, the entire unit is produced by the injection molding method. By means of this method, directly usable moldings can be produced economically in large quantities. For this purpose, by means of an injection molding machine, the respective material, preferably plastic, is plasticized in an injection unit and is injected into an injection molding die. The cavity of the die determines the shape and surface structure of the finished part.

For example, the swirl insert may be formed from at least two segmental swirl elements distributed uniformly about a mid-axis, a flow passage being formed in each case between two adjacent swirl elements. The more swirl elements are provided, the more diffuse or the more uniform is the airstream discharged by the air nozzle.

Preferably, but not under any circumstances necessarily, the swirl elements may be designed in the manner of a swirl blade. The swirl blades may basically be of any desired shape or number, for example in order to achieve different outflow characteristics. For example, the swirl blades may have a straight, oblique or sickle-shaped profile. A rigidly arranged swirl insert has the advantage, as compared with other concepts with movable swirl inserts, that fewer components can be installed and the air nozzle can have a more robust design.

For example, the swirl insert may have a centrally running core jet, around which the swirl elements are arranged in a uniformly distributed manner, so that a combination of diffuse flow air and flow air directed in a straight line can be achieved. In this case, the outer swirl elements give rise to the swirl effect for the purpose of swirling the air.

In a further embodiment, the nozzle body may be mounted continuously adjustably within the reception element via a tenon arrangement formed from two tenons. The nozzle body can thus, for example, be inserted into the reception element or removed from this without the need for a tool. The embodiment presented here has the advantage, as compared with other concepts, that complicated kinematics for changing over individual flow modes are not required, with the result that the air nozzle is distinguished by an especially simple operation, since no other discharge modes can be set. Adjustment or actuation of the reception element or of the nozzle body also results in any event in adjustment or actuation of the nozzle insert.

For example, the reception element may be designed essentially in the form of a ring and have two oppositely arranged flattened side regions with reception orifices for the tenons. The reception element is fastened or arranged rotatably in or on the air feed duct. For example, the reception element may have a corresponding end wall region with a shoulder which can engage into a corresponding orifice in or on the air feed duct or can surround the latter. For example, the reception element, together with the nozzle body, can be plugged, at least in regions, into or onto the air feed duct.

For example, the nozzle body may have an essentially spherical configuration with flattened open pole sides. The flattened open pole sides in this case serve essentially as an air outlet or air inlet area.

For example, the nozzle body or the air nozzle may be pivoted between a neutral position and at least one flow setting.

Further advantages, features and details of the invention may be gathered from the following description, in which an exemplary embodiment of the invention is described with reference to the drawings. In this case, the features mentioned in the claims and in the description may be essential to the invention in each case individually in themselves or in any desired combination.

In the drawings:

FIG. 2 shows the air nozzle according to FIG. 1 with flow settings variable by the adjustment of the swirl body; and FIG. 3 shows the air nozzle according to FIG. 1 with flow settings variable by the adjustment of the reception element.

Figure 1:
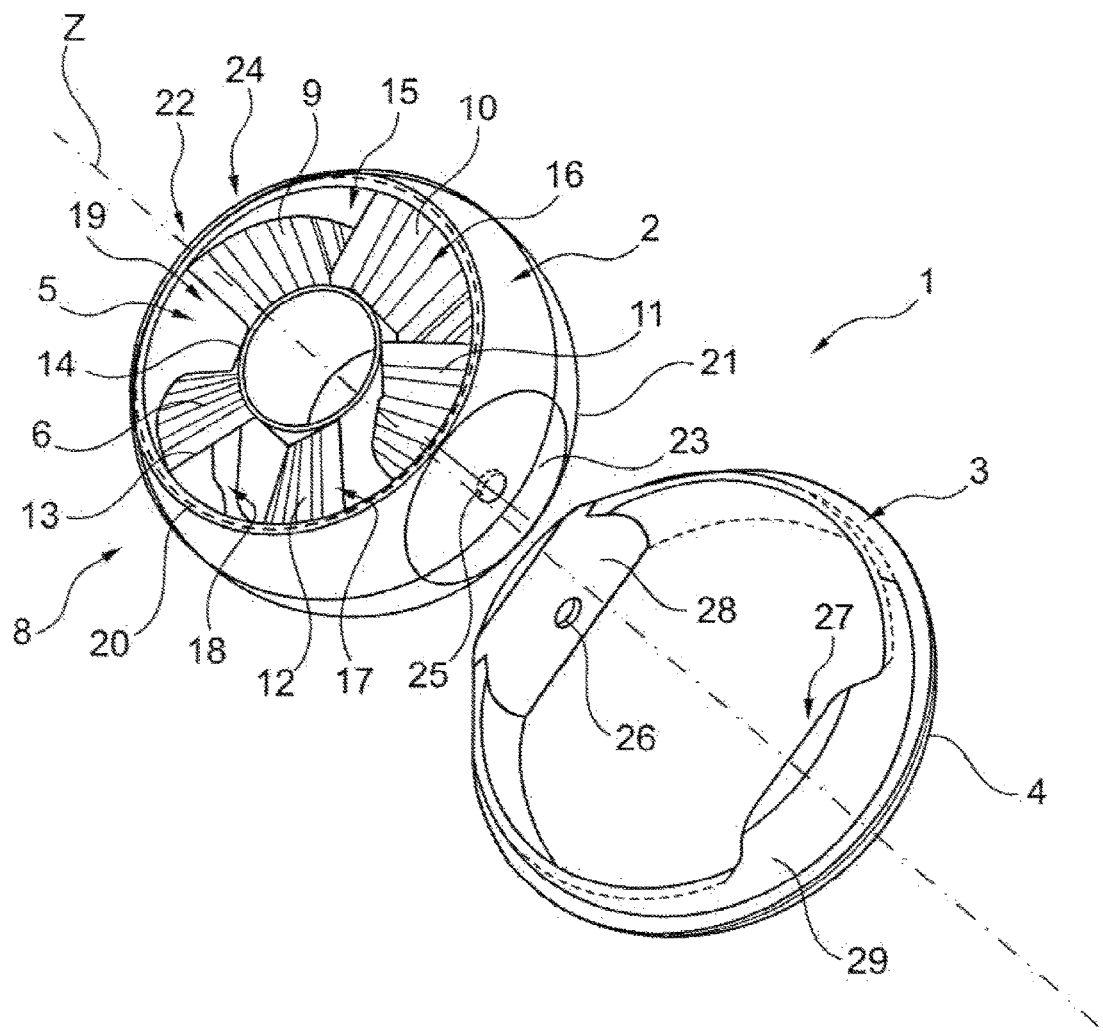
FIG. 1 shows a diagrammatically illustrated air nozzle according to the invention in an exploded illustration.

FIG. 1 shows a diagrammatically illustrated air nozzle 1 in an exploded illustration. The air nozzle 1 is composed of a nozzle body 2 and of a ring-shaped reception element 3 supporting the nozzle body 2. The reception element 3 can engage with its step-shaped end wall region 4 into an air feed duct L, not illustrated here.

In the inner space 5 of the nozzle body 2 is arranged a fixedly arranged swirl insert 6 connected rigidly to the nozzle body 2. The nozzle body 2 and the swirl insert 6 are formed in one piece and together constitute the structural unit 8. The swirl insert 6 is composed of five swirl elements 9, 10, 11, 12, 13 designed in the manner of a swirl blade. Furthermore, a centrally running core jet 14 runs inside the nozzle body 2. The swirl elements 9, 10, 11, 12, 13 are arranged uniformly around the core jet 14 and form the flow passages 15, 16, 17, 18, 19 in each case between two adjacent swirl elements 9, 10, 11, 12, 13.

The nozzle body 2 has an essentially spherical configuration with flattened pole sides 20, 21. Furthermore, the nozzle body 2 has flattened side walls 22, 23. Centrally arranged tenons 24, 25 projecting from the side walls 22, 23 are provided on the flattened side walls. The tenons 24, 25 serve for engagement in reception orifices 26, 27 provided in the reception element 3.

The ring-shaped reception element 3 has side regions 28, 29 of strengthened design. Reception orifices 26, 27 are provided within the flattened side regions 28, 29 of strengthened design. In order to allow continuous adjustment of the nozzle body 2 within the reception element 3, in each case a tenon 24, 25 engages at least in regions into the respective reception orifice 26, 27. The nozzle body 2 is thus mounted within the reception element 3 pivotably essentially through 360 degrees (about the tenon axis Z). The dimensions of the components belonging to one another or engaging in one another may be selected such that essentially the nozzle body 2 is automatically fixed in position within the reception element 3. The nozzle body 2 can thus be adjusted essentially continuously within the reception element 3.

FIG. 2 shows the air nozzle 1, installed in a diagrammatically illustrated air feed duct L, in three different flow settings A, B, C. In this case, flow setting B constitutes the neutral position of the air nozzle 1 or nozzle body 2. The flow setting A shows the nozzle body 2 in a first flow setting rotated downward about the tenon axis Z. The flow setting C shows the nozzle body 2 in a second flow setting rotated upward about the tenon axis Z.

A further possibility for adjusting the air nozzle 1 is afforded by the actuation or adjustment of the reception element 3, as shown in FIG. 3 by the flow settings A', B', C'. In this case, flow setting B' constitutes the neutral position of the air nozzle 1 or nozzle body 2. Flow setting A' shows the nozzle body 2 in a first flow setting rotated counterclockwise about the mid-axis M. Flow setting C' shows the nozzle body 2 in a second flow setting rotated clockwise about the mid-axis M.

The invention claimed is:

1. An air nozzle for discharging an airstream out of an air feed duct of a heating, ventilation, or air conditioning system into a passenger space of a vehicle, composed of a nozzle body and of a reception element receiving the nozzle body, the reception element being arranged on the air feed duct,
   wherein in an inner space of the nozzle body there is arranged a fixedly arranged rigid swirl insert connected to the nozzle body,
   wherein the rigid swirl insert has a centrally running core arranged at its center, bounding a central hole through which an air jet flows in a straight line,
   wherein a plurality of swirl elements are arranged in a uniformly distributed manner radially around the centrally running core, wherein each swirl element extends from the centrally running core to the nozzle body, wherein air flows in a diffuse flow through the plurality of swirl elements in combination with the air jet flowing through the centrally running core,
   wherein the entire nozzle body is mounted continuously adjustably within the reception element via a tenon arrangement formed from two tenons,
   wherein the reception element is rotatably mounted in the air feed duct to permit clockwise or counterclockwise rotation about an axis extending through the center of the centrally running core.

2. The air nozzle as claimed in claim 1, wherein the nozzle body provided with the rigid swirl insert is a structural unit formed in one piece.

3. The air nozzle as claimed in claim 1, wherein the rigid swirl insert is formed from at least two segmental swirl elements distributed uniformly about a mid-axis, wherein a plurality of flow passages are formed between adjacent swirl elements.

4. The air nozzle as claimed in claim 3, wherein the swirl elements are designed in the manner of a swirl blade.

5. The air nozzle as claimed in claim 1, wherein the reception element is designed in the form of a ring and has two oppositely arranged side regions with reception orifices for the tenons.

6. The air nozzle as claimed in claim 1, wherein the nozzle body has an essentially spherical configuration with flattened pole sides.

7. The air nozzle as claimed in claim 1, wherein the nozzle body can be pivoted between a neutral position and at least one flow setting.

8. The air nozzle as claimed in claim 1,
   wherein the nozzle body is formed from a single component.

9. An air nozzle for discharging an airstream out of an air feed duct of a heating, ventilation, or air conditioning system into a passenger space of a vehicle, composed of a nozzle body and of a reception element receiving the nozzle body, the reception element being arranged on the air feed duct,
   wherein in an inner space bounded by the nozzle body there is arranged a fixedly arranged rigid swirl insert connected to the nozzle body,
   wherein the rigid swirl insert has a centrally running core arranged at its center, bounding a central hole through which an air jet flows in a straight line,
   wherein a plurality of swirl elements are arranged in a uniformly distributed manner radially around the centrally running core, wherein each swirl element is connected to the centrally running core and the nozzle body, wherein each swirl element extends from the centrally running core to the nozzle body, wherein air flows in a diffuse flow through the plurality of swirl elements in combination with the air jet flowing through the centrally running core,
   wherein the nozzle body, the plurality of swirl elements, and the centrally running core are mounted continuously adjustably within the reception element via a tenon arrangement formed from two tenons connected to the nozzle body, wherein the reception element is rotatably mounted in the air feed duct to permit clockwise or counterclockwise rotation about an axis extending through the center of the centrally running core.

10. The air nozzle as claimed in claim 9, wherein the nozzle body is formed from a single component.

* * * * *